United States Patent
Firth et al.

[11] 3,870,131
[45] Mar. 11, 1975

[54] INTERNAL SHOE DRUM BRAKES

[75] Inventors: Anthony Christopher Firth; Robin Edward Child, both of Leamington Spa, England

[73] Assignee: Automotive Products Company Limited, Leamington Spa, England

[22] Filed: June 25, 1973

[21] Appl. No.: 373,275

[52] U.S. Cl. .............................. 188/325, 188/217
[51] Int. Cl. ............................................ F16d 51/22
[58] Field of Search .......... 188/325, 331, 332, 335, 188/340, 343, 106 R, 106 A, 106 F, 217, 78

[56] References Cited
UNITED STATES PATENTS

| | | | |
|---|---|---|---|
| 1,980,611 | 11/1934 | Brisson | 188/331 |
| 2,140,741 | 12/1938 | Goepfrich | 188/331 |
| 2,280,784 | 4/1942 | Berno | 188/325 |
| 2,287,261 | 6/1941 | McColgan | 188/325 |
| 2,347,239 | 4/1944 | Berno | 188/325 X |
| 3,724,611 | 4/1973 | Winge | 188/331 |

*Primary Examiner*—Duane A. Reger

[57] ABSTRACT

A caravan has a drum brake fitted to each wheel and a brake operating mechanism which includes a hitch bar for coupling to a tow bar on a tractor vehicle. Limited movement of the hitch bar relative to the caravan in either direction accompanies movement of the tractor vehicle in the same direction relative to the caravan and is transmitted by a linkage to operating rods associated with each brake. A handbrake lever is arranged to impart a greater movement to the operating rods than can be imparted by the hitch bar. Each brake is arranged to exert a greater braking effort for rotation of the drum in the forwards direction than for rotation of the drum in the other direction. One of the brake shoes is mounted on a carrier. A brake shoe expander acts between one end of the carrier and the other brake shoe and is operated by the respective operating rod. A fixed abutment is positioned between the other end of the carrier and the other shoe, and may include a spring for engagement by the carrier. The shoe expander may be of the kind which is mounted for sliding movement on the brake backplate so that thrust due to drum drag on the shoe carried by the carrier during forwards rotation of the drum is transmitted through the expander to the other brake shoe.

4 Claims, 10 Drawing Figures

INTERNAL SHOE DRUM BRAKES

This invention relates to internal shoe drum brakes for trailer vehicles. The internal shoe drum brakes are of the kind which comprise a pair of brake shoes and a shoe expanding device for urging the brake shoes into contact with a brake drum in order to apply a braking force to the brake drum for service braking, the arrangement being such that the braking force applied to the brake drum as a result of operation of said shoe expanding device is greater when the brake drum tends to rotate or rotates in one sense than when the brake drum tends to rotate or rotates in the opposite sense.

A caravan, or other form of trailer vehicle, provided with a brake which is operable to retard rotation of a wheel of the trailer vehicle, usually is arranged so that the brake is applied automatically by a mechanism, known sometimes as an "overrun brake operating mechanism", when the trailer vehicle and its tractor vehicle tend to move towards one another. Thus the brake of the trailer vehicle is operated automatically when brakes of the tractor vehicle are operated for service braking. An internal shoe drum brake of the kind referred to is suitable particularly for use as a brake of a trailer vehicle because it can be fitted to the trailer vehicle so that, when the brake is operated for service braking, the greater braking force applied when the brake drum tends to rotate or rotates in said one sense is arranged to hold the trailer vehicle stationary against movement in the forward direction, whilst the lesser braking force applied when the brake drum tends to rotate in the opposite sense permits the trailer vehicle to be reversed. Provision of an internal shoe drum brake of the kind referred to as a brake of a caravan or other form of trailer vehicle results in there being no need to provide means operable by a driver of the tractor vehicle to render the brake inoperative so as to permit the caravan or other trailer vehicle to be reversed and thus eliminates a risk that the brake of the caravan or other trailer vehicle may be in an inoperative mode when a journey is commenced.

One object of this invention is to provide an internal shoe drum brake of the kind referred to in which the shoe expanding device can be operated to apply the brake for parking purposes as well as for service braking.

According to one aspect of this invention there is provided an internal shoe drum brake of the kind referred to in which one of the brake shoes is mounted for circumferential movement upon a carrier member and abutment means provide a fixed abutment for one end of the carrier member, wherein the shoe expanding device, which acts between the other end of the other brake shoe and an adjacent end of the carrier member so as to move the two brakes shoes away from each other into contact with the brake drum, is constructed so that thrust can be transmitted therethrough from said one brake shoe to the other brake shoe, and a stop is provided for abutment by said one brake shoe when said shoe expanding device is operated for parking purposes and the brake drum tends to rotate in said opposite sense so that said one shoe is applied to the drum to prevent rotation of said brake drum in either sense.

Preferably the shoe expanding device comprises a housing mounted between the other pair of adjacent ends of the brake shoes for sliding movement, the respective end of each brake shoe being urged into contact with a respective end of the housing by brake pull-off spring means, and operating means operable to separate the housing and the carrier member, the arrangement being such that circumferential movement of said one brake shoe away from the respective fixed abutment and relative to said carrier member, due to rotation of the brake drum in said one sense when said one brake shoe is held in contact therewith, is transmitted to the other brake shoe through the housing. The operating means may comprise an operating rod for connection to a brake operating mechanism, the operating rod being hinged to one end of a bell crank lever being mounted pivotally within the housing by its elbow and having its other end hinged to one end a strut member which has its other end in abutment with the carrier member.

Conveniently the carrier member has an abutment part which is arranged to abut the inner surface of said one brake shoe substantially midway between the ends of said one brake shoe so that brake applying thrust imparted to the carrier member by the shoe expanding device is transmitted to said one brake shoe via said abutment part.

According to another aspect of this invention there is provided an internal shoe drum brake of the kind referred to in which one of the brake shoes is mounted for circumferential movement on a carrier member and abutment means provide a fixed abutment for one end of the carrier member, wherein the carrier member carries a thrust member which is associated with said one brake shoe, the shoe expanding device, which acts upon the other end of the carrier member, acts through the carrier member and the thrust member to urge said one brake shoe into contact with an associated brake drum and affords an abutment for the adjacent end of said one brake shoe when said one brake shoe is urged into contact with an associated brake drum which is rotating or tending to rotate in said one sense, the association of the thrust member with said one brake shoe being such that said one brake shoe is applied to the brake drum with sufficient force to retard or prevent rotation of the brake drum in said one sense, and such that, when the shoe expanding device is operated for service braking and the brake drum is rotating in the opposite sense, said adjacent end of said one brake shoe separates from said shoe expanding device and said one brake shoe just contacts the associated brake drum and exerts substantially no retarding force on the brake drum, and a stop is provided for abutment by said one shoe when said shoe expanding device is operated for parking purposes and the brake drum tends to rotate in said opposite sense so that said one shoe is applied to the drum to prevent rotation of said brake drum in either sense.

Preferably the thrust member abuts a profiled part of the radially inner surface of said one brake shoe, the profiled radially inner surface part comprising one portion with which said thrust member normally is in abutment, another portion which is nearer the shoe expanding device than is said one portion and which is further from the centre of the brake than is said one portion, and a ramp portion which connects said one portion to the other portion, the thrust member being in abutment with the ramp portion when the shoe expanding device is operated for service braking and the brake drum is rotating in said opposite sense.

According to yet another aspect of this invention there is provided the combination of an internal shoe drum brake according to this invention and operating means for operating said brake shoe expanding device, the operating means being arranged so that the adjacent ends of the two shoes are separated by a greater amount when the shoe expanding device is operated for parking purposes than when the shoe expanding device is operated for service braking, the movement imparted to said one brake shoe when the shoe expanding device is operated for service braking whilst an associated brake drum is rotating or tending to rotate in said opposite sense being insufficient to move said one brake shoe into abutment with said stop.

In such a combination the shoe expanding device may comprise a wedge expander including a pair of tappets slidable in a through bore in a fixed housing and a wedge which is operable to urge the tappets apart, the wedge being connected to an operating rod for connection to a brake operating mechanism.

The operating means may include a resilient link which is arranged to transmit a brake applying load to the shoe expanding device, the maximum brake applying load for service braking being insufficient to overcome the resilient loading of the resilient link completely, whilst the brake applying load for parking purposes is sufficient to overcome the resilience of the resilient link.

Embodiments of this invention will be described now by way of example with reference to the accompanying drawings, of which.

Figure 1:
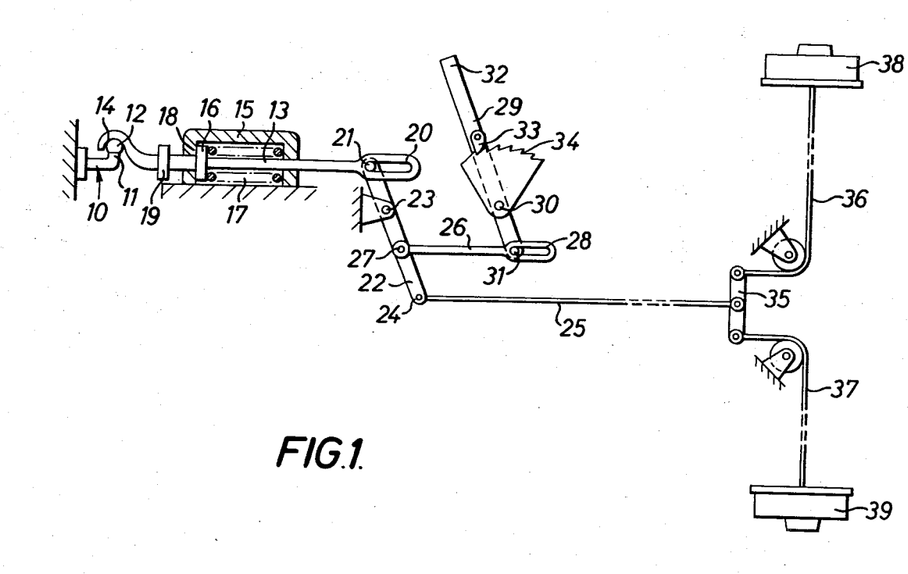
FIG. 1 is a diagrammatic representation of a caravan brake operating mechanism.

Referring now to FIG. 1, a conventional tow bar 10 is fixed to the rear of a tractor vehicle in the usual manner. The tow bar 10 has the usual upstanding post 11 that has a ball 12 formed at its upper end.

The caravan has a hitch bar 13 which projects forwards and which defines a socket 14 at its front. The ball 12 is received in the socket 14 of the hitch bar 13 in the known manner. The hitch bar 13 passes through a hollow housing 15 that is fixed to the body of the caravan and has one flange 16 within the cavity of the hollow housing 15. A coil spring 17 takes its reaction from the housing 15 and urges the hitch bar 13 forwards. Forward movement of the hitch bar 13 is limited by the flange 16 which engages the forward end wall 18 of the housing 15, and rearward movement of the hitch bar 13 is limited by engagement with the housing 15 of another flange 19 formed on the hitch bar 13 between the socket 14 and the housing 15.

The end of the hitch bar 13 remote from the socket 14 defines an elongate slot 20, which is longer than the path of movement of the hitch bar 3 which is permitted by the flanges 16 and 19. A pin 21 is engaged in the slot 20 and is carried by a lever 22 that is pivotally supported by a fixed pivot 23.

The end 24 of the lever 22 remote from the slot 20 is hinged to a link 25. A link 26 is hinged by one of its ends to a point 27 on the lever 22 between the fixed pivot 23 and the lever end 24. The end of the link 26 remote from the pivot point 27 defines an elongate slot 28. A handbrake lever 29 is mounted pivotally at a point 30 between its ends. The end 31 of the hand brake lever 29 which is remote from the end 32 thereof that is adapted to be gripped manually, carries a pin which is engaged within the elongate slot 28. The handbrake lever 29 also carries a pawl 33 which cooperates with an arcuate ratchet 34 so that the handbrake lever 29 is held releasably in any position to which it is moved manually.

The link 25 is connected to the centre of a yoke 35. A flexible tension member 36, 37 (such as a Bowden cable) extends from each end of the yoke 35 to a shoe expanding device of a respective internal shoe drum brake 38, 39 each of the two brakes 38 and 39 being mounted upon a respective one of the two wheels of the caravan.

The arrangement is such that, when the hand brake lever 29 is held in the brakes released position by the pawl and ratchet mechanism 33, 34, forward movement of the tractor vehicle is transmitted to the caravan through the tow bar 10, the hitch bar 13, the flange 16 and the housing 15, the pin 21 being spaced from both ends of the elongate slot 20 so that no thrust is transmitted to the lever 22.

If the caravan tends to move forward more quickly than the tractor vehicle, for example when the brakes of the tractor vehicle are applied for service braking, or when the tractor vehicle is reversed, the hitch bar 13 is moved against the action of the compression spring 17 until the flange 19 abuts the housing 15. Such movement of the hitch bar 13 is transmitted to the pin 21 so that the lever 22 is pivoted about its pivot 23. Thus the link 25 is pulled forwards and the thrust is transmitted through the yoke 35 and the two tension members 36 and 37 to operate the respective brake shoe expanders to apply the shoes of the two internal shoe drum brakes 38 and 39 to the surrounding brake drums.

Referring now to FIGS. 2 to 5 of the drawings, the internal shoe drum brake 38 comprises an annular backplate 40. An abutment assembly 41 is mounted on the annular backplate 40. The abutment assembly 41 comprises a cup-shaped casing 42, which is fixed to the backplate 40 with its longitudinal axis 43 extending chordwise of the annular backplate 40, an axially extending central piller 44 which is fixed to the base of the cup-shaped casing 42 and projects through the mouth of the cup-shaped casing 42, a flanged sleeve 45 which slides on the pillar 44, a circlip 46 located within a groove in the inner cylindrical surface of the cup-shaped casing 42, and a coil spring 47 having one end in contact with the base of the cup-shaped casing 42 and the other end acting on the flanged sleeve 45 so as to urge the flanged sleeve 45 into contact with the circlip 46.

In addition to the central aperture 48, the backplate 40 defines an aperture 49 diametrically opposite the abutment assembly 41. An operating rod 50 extends through the aperture 49. The end of the operating rod 50 on the opposite side of the backplate 40 from the abutment assembly 41 is connected to the tension member 36. The gap between the operating rod 50 and the periphery of the aperture 49 is closed by closure means including a sealing boot 51 of flexible material. A tongue 52 is integral with the backplate 40 and has two parts, one of the parts extending from the radially inner edge of the aperture 49 normal to the remainder of the backplate 40 and on the same side of the backplate 40 as the abutment assembly 41, and the other part projecting from said one part towards the abutment assembly 41 and parallel to the remainder of the backplate 40 from which it is spaced.

A shoe expanding device 53 is mounted on the same side of the backplate 40 as the abutment assembly 41 for sliding movement chordwise of the annular backplate 40 over the aperture 49. The device 53 comprises a lever mechanism 54 mounted within a housing 55. The housing 55 comprises an apertured base plate 56 which is mounted slidably upon the surface of the backplate 40, sidewalls 57 which project at right angles from the baseplate 56, and a cover 58 which closes the end of the housing 55 remote from the backplate 40. The lever mechanism 54 comprises a strut 59 which extends through an aperture 60 in a sidewall 57 of the housing 55 and which is aligned with the chordwise path of sliding movement of the housing 55. The end 61 of the strut 59 within the housing 55 is hinged to one end of a bell crank lever 62 which is mounted pivotally at its elbow upon a pivot pin 63. The pivot pin 63 extends across the interior of the housing 55 and is anchored at its ends within the respective side walls 57. The other end 64 of the bell crank lever 62 is hinged to the adjacent end of the operating rod 50. A recess 65 is formed in the end of the strut 59 which is outside the housing 55, the distance between the base of the recess 65 and the mouth of the recess 65 being sufficient to ensure that the base is positioned within the interior of the housing 55.

The abutment device 41 is located between one pair of adjacent ends of two arcuate brake shoes 66 and 67 which are carried by the backplate 40, and the shoe expanding device 53 is positioned between the other pair of adjacent ends of the arcuate brake shoes 66 and 67. The pillar 44 and the strut 59 both project towards the arcuate brake shoe 67 which is mounted on a carrier member 68 for circumferential movement relative to the backplate 40. The carrier member 68 comprises two arcuate plates 69 and 70 held in parallel spaced relation by three rivets 71, 72 and 73 spaced circumferentially about their radially inner edges. The web 74 of the arcuate brake shoe 67 projects radially inwardly into the space between the two plates 69 and 70.

A pin 89 which passes through coaxial holes in the carrier plates 69 and 70 and is located against movement therethrough by circlips 90 which engage the outer surfaces of the carrier plates 69 and 70, also passes through a substantially pear-shaped aperture 91 in the web 74 of the brake shoe 67. Thus the circumferential movement of the brake shoe 67 relative to the carrier 68 is limited to that permitted by the pin 89 in the pear-shaped slot 91.

A pair of brake pull-off springs 75 and 76 act between the web 74 of the arcuate brake shoe 67 and the web 77 of the arcuate brake shoe 66. Due to the action of the pull-off springs 75 and 76, the respective ends of the web 77 are held in contact with the base of the fixed cup-shaped casing 42 and the adjacent sidewall 57 of the housing 55; the respective end of the web 74 extends beyond the respective ends of the plates 69 and 70 into the recess 65 and is held in contact with the adjacent sidewall 57 of the housing 55, the respective ends of the plates 69 and 70 being held in contact with the strut 59; the other ends of the plates 69 and 70, which extend beyond the adjacent end of the web 74, are held in contact with the flanged sleeve 45, so that the end of the pillar 44 is between the plates 69 and 70 and is spaced from the web 74; and the inner edge of the web 74 is held in contact with the central rivet 72 which is larger than the other two rivets 71 and 73. The inner edge of the web 74 is recessed at 78 and 79 to provide clearance for the rivets 71 and 73. One end of the pull-off spring 75 which is nearer the abutment assembly 41 than the expanding device 53, is hooked into a hole 80 in the web 77 of the shoe 66 and the other end of the pull-off spring 75 is hooked into a hole 81 in the web 74 of the shoe 67. One end of the pull-off spring 76 which is nearer the expanding device 53 than the abutment assembly 41, is hooked into a hole 82 in the web 77, and the other end is hooked into a hole 83 formed in the web 74. The pull-off spring 76 comprise two coil portions 84 and 85 interconnected by a rod portion 86 which passes between the tongue 52 and the backplate 40. It will be appreciated that the brake shoes 66 and 67 and the expanding device 53 are urged towards the backplate 40 by the action of the tongue 52 on the rod portion 86.

Figure 2:
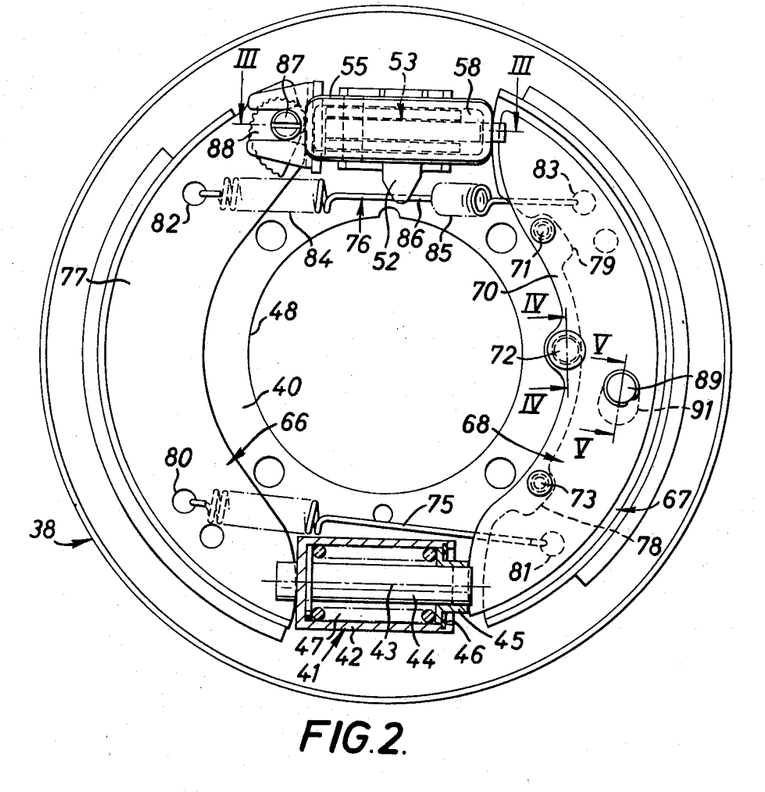
FIG. 2 is a front elevation of one form of internal shoe drum brake for a caravan.
Figure 3:
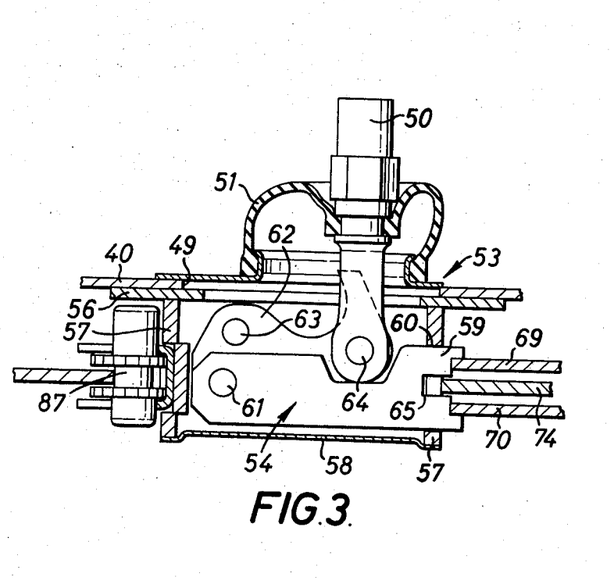
FIG. 3 is a section of the line III—III of FIG. 2.
Figure 4:
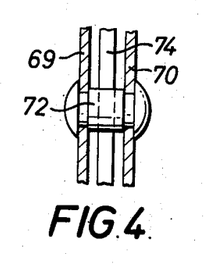
FIG. 4 is a section on the line IV—IV of FIG. 2.
Figure 5:
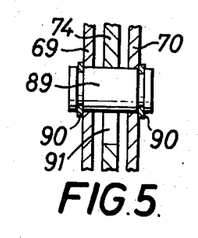
FIG. 5 is a section on the line V—V of FIG. 2.

The arcuate brake shoe 66 carries an adjusting device 87, the adjusting device 87 enabling the position relative to the backplate 40 adopted by the brake shoes 66 and 67 when the brake 38 is released to be adjusted so as to compensate for wear of the brake linings, and being of the known type which incorporates a snail cam 88.

The brake 38 is surrounded by a cylindrical drum (not shown) which is mounted coaxially on a wheel of the caravan, the drum being rotated in the anticlockwise direction, as seen in FIG. 2, by forward movement of the caravan.

The brake 39 is similar to the brake 38 and will not be described herein in detail. It will be apparent that the tension member 37 is connected to the operating rod 50 of the brake 39.

Where the caravan tends to move forwards more quickly than the tractor vehicle, for example, when the brakes of the tractor vehicle are applied for service braking, a pulling force is applied by the tension members 36 and 37 to the end of the operating rods 50 of the two brakes 38 and 39. The distance through which the operating rods 50 may be moved in response to such a pulling force is limited by engagement of the flange 19 with the housing 15. For convenience, the following description will be limited to a description of operation of the brake 38. Operation of the brake 39 is similar.

The strut 59 is moved outwardly through the aperture 60 when the operating rod 50 is pulled by the tension member 37. The strut 59 thus imparts a thrust to the plates 69 and 70 of the carrier member 68. The reaction to that thrust is transmitted via the pivot pin 63 to the housing 57 which is moved in the opposite direction to urge the brake shoe 66 into engagement with the brake drum. The thrust applied to the carrier 68 is transmitted to the brake shoe 67 via the central rivet 72 and the inner surface of the web 74. Thus the thrust imparted to the brake shoe 67 to urge it into engagement with the brake drum, is approximately twice the thrust imparted to the carrier 68 due to the lever action of the carrier 68.

When the brake shoes 66 and 67 engage the drum, rotation of the drum with forward movement of the caravan drags the brake shoe 67 with it. Such circumferential movement of the brake shoe 67 is relative to the carrier 68 and is transmitted to the brake shoe 66 via the housing 55 of the expanding device 53 with which the web 74 is in contact, so that the braking force exerted by the brake shoe 66 is increased. It will be noted that the brake applying thrust is applied to the leading end of the brake shoe 66 for rotation of the drum with forward movement of the caravan. It should be understood that the limited movement of the operating rod 50 is insufficient to move the brake shoe 67 into contact with the pillar 44 so that the reaction to the thrust applied to the carrier 68 is provided by the coil spring 47. The loading of the coil spring 47 is selected so that the coil spring 47 yields when the thrust applied to the carrier 68 exceeds a predetermined maximum. Thus the application of an excessive braking force to the brake drum by the brake shoe 67, which may lead to locking of the respective wheel, is avoided.

During rotation of the drum with reversing movement of the caravan, when the brake shoes 66 and 67 are engaged with the drum, circumferential movement of the brake shoe 67 relative to the carrier 68 is prevented by the action of the pin 89 in the aperture 91. Thus the only thrust applied to the brake shoe 66 is the reaction to the thrust applied to the carrier 68 and that thrust is applied to the trailing end of the brake shoe 66. Consequently the resultant braking force applied to the drum by the brake shoe 66 is less than would be so if the same effort was applied to the leading end of that shoe.

The operating rod 50 can be moved through a greater distance by operation of the hand brake lever 29 than is permitted for automatic operation of the brake. In consequence a greater thrust can be imparted to the carrier 68, the greater thrust being sufficient to overcome the loading of the coil spring 47 and move the adjacent end of the web 74 into contact with the pillar 44.

The abutment assembly 41 may include means which oppose radial outward movement of the adjacent ends of the carrier plates 69 and 70 which could lead to lost travel.

Another form of internal shoe drum brake which is suitable for use as the internal shoe drum brake 38 or 39 will be described now by way of example with reference to FIGS. 6 to 9 of the accompanying drawings. The internal shoe drum brake comprises an annular backplate 100. An abutment assembly 101 is mounted on the annular backplate 100.

Figure 6:
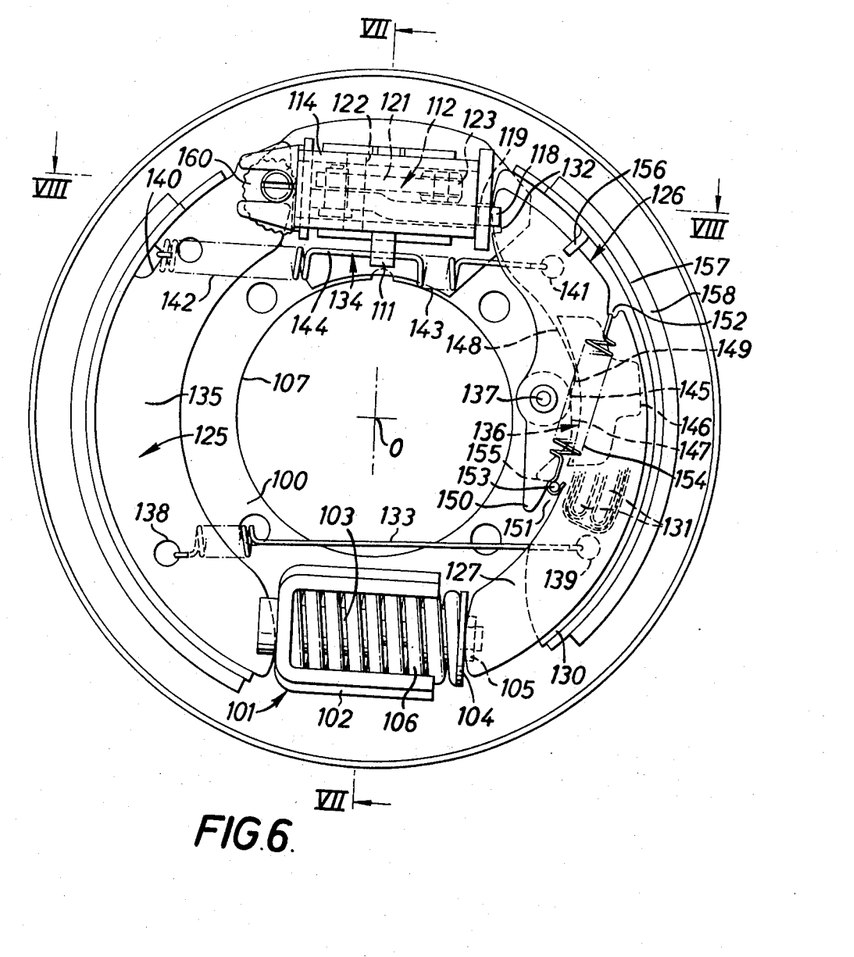
FIG. 6 is a front elevation of another form of internal shoe drum brake for a caravan.
Figure 7:
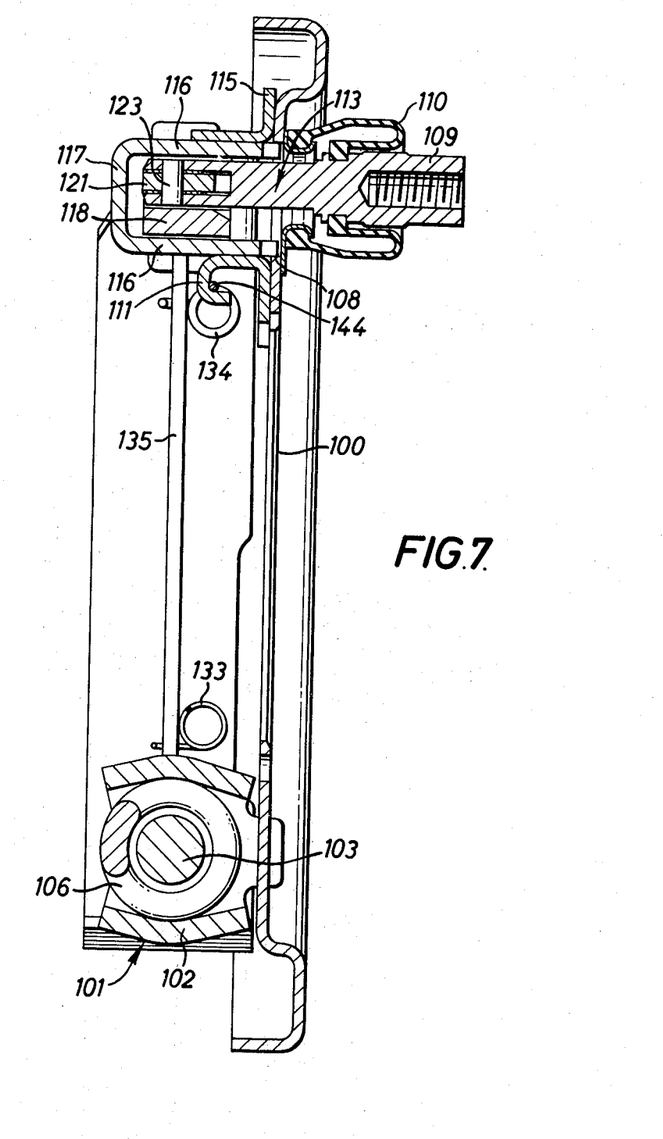
FIG. 7 is a section on the line VII—VII of FIG. 6.
Figures 8, 9, 10:
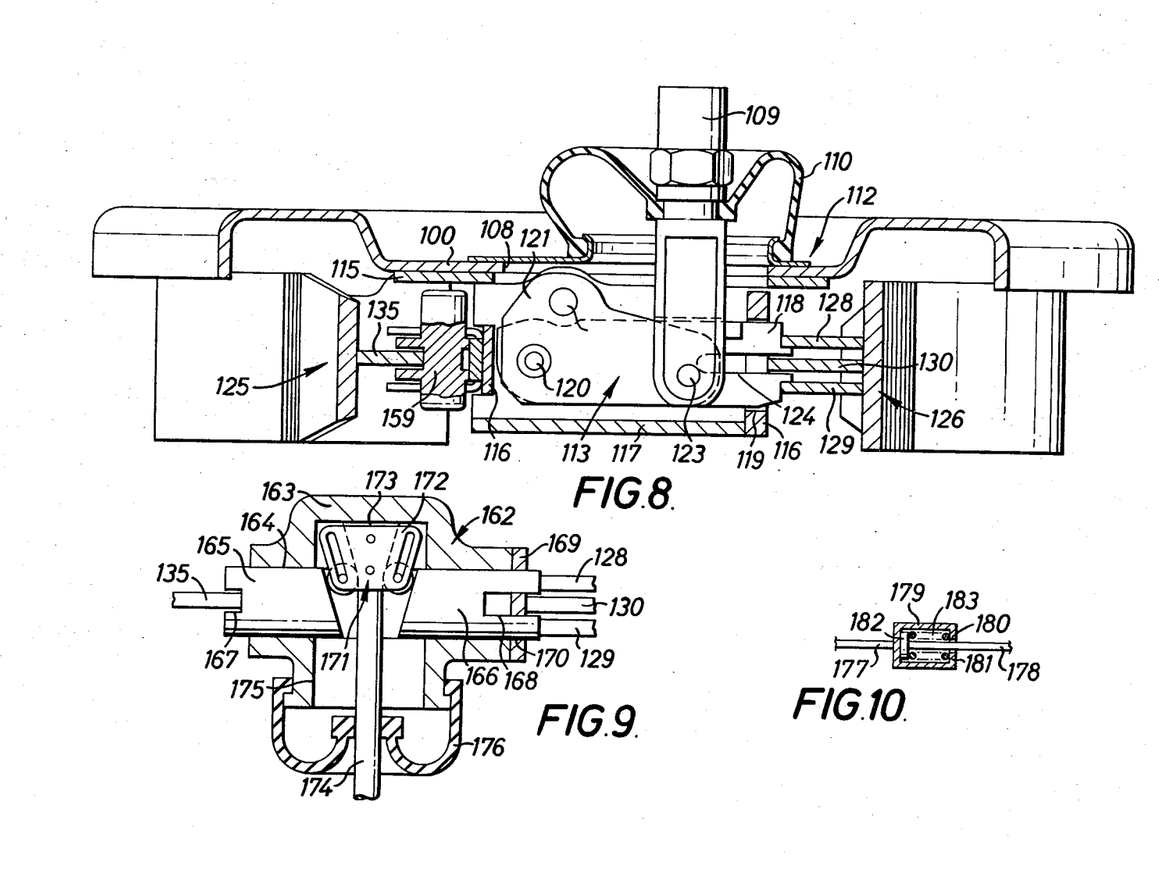
FIG. 8 is a section on the line VIII—VIII of FIG. 6.
FIG. 9 is a sectioned view of an alternative form of shoe expanding device for the internal shoe drum brake shown in FIGS. 6 to 8.
FIG. 10 illustrates a modification of the brake operating mechanism shown in FIG. 1.

The abutment assembly 101 comprises a U-shaped structure 102. The structure 102 is fixed to the backplate 100 with the limbs and base of the U projecting from the radial face of the backplate 100 and with the limbs extending chordwise of the annular backplate 100. A central pillar 103 is fixed to the base of the U-shaped structure 102 and projects beyond the free ends of the limbs thereof. A flanged sleeve 104 slides on the pillar 103. A pin 105 is fixed to the free end of the pillar 103. A coil spring 106 has one end in contact with the base of the U-shaped structure 102 and the other end acting on the flanged sleeve 104 so as to urge the flanged sleeve 104 into contact with the pin 105.

In addition to the central aperture 107, the backplate 100 defines an aperture 108 diametrically opposite the abutment assembly 101. An operating rod 109 extends through the aperture 108. The end of the operating rod 109 on the opposite side of the backplate 100 from the abutment assembly 101 is connected to the respective tension member 36 or 37. The gap between the operating rod 109 and the periphery of the aperture 108 is closed by closure means including a sealing boot 110 of flexible material. A curved tongue 111 is integral with the backplate 100 and has two parts, one of the parts extending from the radially inner edge of the aperture 108 normal to the remainder of the backplate 100 and on the same side of the backplate 100 as the abutment assembly 101, and the other part which is arcuate, projecting from said one part towards the abutment assembly 101 and presenting its concave surface to the backplate 100.

A shoe expanding device 112 is mounted on the same side of the backplate 100 as the abutment assembly 101 for sliding movement chordwise of the annular backplate 100 over the aperture 108. The device 112 comprises a lever mechanism 113 mounted within a housing 114. The housing 114 comprises an apertured base plate 115 which is mounted slidably upon the surface of the backplate 100, sidewalls 116 which project at right angles from the baseplate 115, and a cover 117 which closes the end of the housing 114 remote from the backplate 100 and extends parallel to the backplate 100. The lever mechanism 113 comprises a strut 118 which extends through an aperture 119 in a sidewall 116 of the housing 114 and which is aligned with the chordwise path of sliding movement of the housing 114. The end 120 of the strut 118 within the housing 114 is hinged to one end of a bell crank lever 121 which is mounted pivotally at its elbow upon a pivot pin 122. The pivot pin 122 extends across the interior of the housing 114 and is anchored at its ends within the respective side walls 116. The other end 123 of the bell crank lever 121 is hinged to the adjacent end of the operating rod 109. A recess 124 is formed in the end of the strut 118 which is outside the housing 114, the distance between the base of the recess 124 and the mouth of the recess 124 being sufficient to ensure that the base is positioned within the interior of the housing 114.

The abutment device 101 is located between one pair of adjacent ends of two arcuate brake shoes 125 and 126 which are carried by the backplate 100, and the shoe expanding device 112 is positioned between the other pair of adjacent ends of the arcuate brake shoes 125 and 126. The pillar 104 and the strut 118 both project towards the arcuate brake shoe 126 which is mounted on a carrier member 127 for circumferential movement relative to the backplate 100. The carrier member 127 comprises two arcuate plates 128 and 129. The web 130 of the arcuate brake shoe 126 projects radially inwardly into the space between the two plates 128 and 129 and is located for sliding movement therebetween by pairs of arcuate dimples 131 which project towards the web 130 from the adjacent faces of both plates 128 and 129. The end of each plate 128, 129 nearer to the expanding device 112 is recessed at 132 to receive the end of the strut 118 so that the plates 128 and 129 are located against radial movement by the strut 118.

A pair of brake pull-off springs 133 and 134 act between the web 130 of the arcuate brake shoe 126 and the web 135 of the arcuate brake shoe 125. Due to the action of the pull-off springs 133 and 134, the respective ends of the web 135 are held in contact with the base of the fixed U-shaped structure 102 and the adjacent sidewall 116 of the housing 114; the respective end of the web 130 extends beyond the respective ends of the plates 128 and 129 into the recess 124 and is held in contact with the adjacent sidewall 116 of the housing 114, the respective ends of the plates 128 and 129 being held in contact with the strut 118 which is located within the recesses 132; the other ends of the plates 128 and 129, which extend beyond the adjacent end of the web 130, are held in contact with the flanged sleeve 104 so that the end of the pillar 103 is between the plates 128 and 129 and is spaced from the web 130; and a central part 136 of the inner edge of the web 130 which is specially profiled, is held in contact with a roller 137 carried by the carrier member 127. One end of the pull-off spring 133, which is nearer the abutment assembly 101 than the expanding device 112, is hooked into a hole 138 in the web 135 of the shoe 125 and the other end of the pull-off spring 133 is hooked into a hole 139 in the web 130 of the shoe 126. One end of the pull-off spring 134 which is nearer the expanding device 112 than the abutment assembly 101, is hooked into another hole 140 in the web 135, and the other end is hooked into another hole 141 in the web 130. The pull-off spring 134 comprises two coil portions 142 and 143 interconnected by a rod portion 144 which passes between the tongue 111 and the backplate 100.

The specially profiled radially inner surface part 136 of the web 130 is defined by an insert 145 of hardened material which is held in position within a suitably shaped space in the web 130 by a pair of retaining plates 146 secured to opposite faces of the web 130. The profile of the radially inner surface part 136 consists of one portion 147 which is shown in FIG. 6 to be in contact with the roller 137, another portion 148 which is further from the centre 0 of the brake than is said one portion 147 and which is nearer to the expanding device 112 than is said one portion 147, and a ramp portion 149 which extends between the two portions 147 and 148.

The radially inner edge of each plate 128, 129 defines a finger 150 between the roller 137 and the abutment assembly 101. The position of the finger 150 on the plate 129, which is not shown in the drawings because it is hidden by the finger 150 on the plate 128 in FIG. 6, will be understood from the following description with reference to FIG. 6. The fingers 150 project substantially circumferentially towards the abutment assembly 101 so as to define a respective recess 151 in the inner periphery of each plate 128, 129. The mouth of each recess 151 faces the abutment assembly 101. The radially outer surface of each plate 128, 129 defines a recess 152. A pin 153 extends across the carrier 127 and projects through the two recesses 151. Each outer end of the pin 153 is fixed to one end of a respective coil spring 154 which each has its other end anchored in the respective recess 152. Like the finger 150 on the plate 129, the recesses 151 and 152 on the plate 129 and the spring 153 associated therewith are not shown in the drawings because they are hidden by the corresponding parts shown. It will be understood that the carrier plates 128 and 129 extend between the two springs 154.

The radially inner surface of the web 130 has an inwardly projecting finger 155 between the pin 153 and the central surface part 136. The springs 154 act to hold the pin 153 against the finger 155.

The brake shoe 126 has a pair of ears 156 which project inwardly, one on each side of the carrier 128, from the arcuate carrier 157, for the shoe linings 158. The ears 156 locate the carrier 127 against axial movement.

The arcuate brake shoe 125 carries an adjusting device 159, the adjusting device enabling the position relative to the backplate 100 adopted by the brake shoes 125 and 126 when the brake 38, 39 is released to be adjusted so as to compensate for wear of the brake linings 158, and being of the known type which incorporates a snail cam 160.

The brake 38, 39 is surrounded by a cylindrical drum (not shown) which is mounted coaxially on a wheel of the caravan, the drum being rotated in the anticlockwise direction, as seen in FIG. 6, by forward movement of the caravan.

When the caravan tends to move forwards more quickly than the tractor vehicle for example, when the brakes of the tractor vehicle are applied for service braking, a pulling force is applied by the respective tension member 36, 37 to the end of the operating rod 109 remote from the bell crank lever 121. The distance through which the operating rod 109 may be moved in response to such a pulling force is limited by engagement of the flange 19 with the housing 15. Movement of the operating rod 109 in response to such a pulling force, moves the strut 118 outwardly through the aperture 119 and imparts a thrust to the plates 128 and 129 of the carrier member 127. The reaction to that thrust is transmitted via the pivot pin 122 to the housing 114 which is moved in the opposite direction to urge the brake shoe 125 into engagement with the brake drum 161. The thrust applied to the carrier 127 is transmitted to the brake shoe 126 via the roller 137 which is in contact with the inner surface portion 147 due to the action of the springs 154 on the finger 155. Thus the thrust imparted to the brake shoe 126 to urge it into engagement with the brake drum, is approximately twice the thrust imparted to the carrier 127 The radial distance from the surface portion 147 to the shoe lining 158 is such that the shoe 126 exerts sufficient force on the drum to retard rotation of the drum.

When the brake shoes 125 and 126 engage the drum, rotation of the drum with forward movement of the caravan drags the brake shoe 126 with it. Such circumferential movement of the brake shoe 126 is relative to the carrier 127 and is transmitted to the brake shoe 125 via the housing 114 of the expanding device 112 with which the web 130 is in contact, so that the braking force exerted by the brake shoe 125 is increased. It will be noted that the brake applying thrust is applied to the leading end of the brake shoe 125 for rotation of the drum with forward movement of the caravan. It should be understood that the limited movement of the operating rod 109 is not sufficient to move the brake shoe 126 into contact with the pillar 103 so that the reaction to the thrust applied to the carrier 127 is provided by the coil spring 106. The loading of the coil spring 106 is selected so that the coil spring 106 yields when the thrust applied to the carrier 127 exceeds a predetermined maximum. Thus the application of an excessive braking force to the brake drum by the brake shoe 126, which may lead to locking of the respective wheel, is avoided.

Rotation of the drum with reversing movement of the caravan when the brake shoes 125 and 126 are engaged with the drum, drags the brake shoe 126 with it, thus moving the brake shoe 126 away from the housing 114 and towards the abutment assembly 101. Such movement of the brake shoe 101 extends the springs 154 and moves the surface portion 147 out of contact with the roller 137. The ramp portion 149 results in the pressure applied to the brake drum by the shoe 126 being reduced until the load exerted on the shoe 126 by reverse movement of the drum is balanced by the load applied to the shoe 126 by the extended springs 154. The radial distance from the point on the radially inner surface of the shoe 126 to the shoe lining 158 when the load exerted by the springs 154 balances the drag force exerted by the drum on the shoe 126 is just enough to ensure that the shoe lining 158 touches the drum but is insufficient to ensure that a significant braking force is applied to the drum when the brake is applied for service braking. It will be understood that the only thrust applied to the brake shoe 125 is the reaction to the thrust applied to the carrier 127 and that the thrust is applied to the trailing end of the brake shoe 125. The resultant braking force applied to the drum by the brake shoe 125 is no greater than that applied by the brake shoe 126. Moreover the force exerted by the shoe 125 is less than would be so if the same effort was applied to the leading end of that shoe.

The operating rod 109 can be moved through a greater distance by operation of the hand brake lever 29 than is permitted for automatic operation of the brake. In consequence a greater thrust can be imparted to the carrier 127, the greater thrust being sufficient to compress the coil spring 106 and move the adjacent end of the web 130 towards the pillar 103. The coil spring 106 ensures that an adequate braking force is applied to the drum when the hand brake is applied whilst the caravan is parked on the level or tends to roll forwards. Furthermore, the coil spring 106 allows the adjacent end of the web 130 to contact the pillar 103, which thus affords an abutment for the adjacent end of the web 130, when the hand brake is applied and the caravan tends to roll backwards.

FIG. 9 shows an alternative form of brake shoe expander 162 for use in the internal shoe drum brake shown in FIGS. 6 to 8 of the accompanying drawings. The brake shoe expander 162 comprises a housing 163 that is fixed to the backplate 100 and which defines a through bore 164. A pair of tappets 165 and 166 slide in the through bore 164. The tappet 165 projects through the end of the through bore 164 which is nearer to the brake shoe 125 and has a recess 167 at its outer end which receives the web 135 of the brake shoe 125. The end of the tappet 166 remote from the recess 167 has a diametral recess 168 which serves the same function as the recess 124 of the brake shoe expander 112. The outer end surface portions of the tappet 166 on each side of the mouth of the recess 168 each abut a respective one of the two carrier plates 128 and 129. An end plate 169 is fixed to the end of the housing 163 nearer to the brake shoe 126 and defines an aperture 170 through which the tappet 166 projects and serves as a fixed abutment for the end of the web 130 of the brake shoe 126 which projects into the recess 168.

A wedge device 171, carrying the usual caged roller assembly 172, is positioned within the through bore 164 between the two tappets 165 and 166. The wedge 173 is formed at the end of a pull rod 174 which projects through a radial passage 175 in the wall of the housing 163 and which is connected pivotally at its other end (not shown) to the respective tension member 36 or 37. The adjacent faces of the tappets 165 and 166, which are engaged by the rollers 176, converge towards the radial passage 175. The space between the pull rod 174 and the housing 164 is closed by a boot 176 of flexible material.

It will be apparent that operation of the mechanism described above with reference to FIG. 1 to apply the brakes results in a pulling force being applied to the pull rod 174 by the respective tension member 36 or 37, so that the tappets 165 and 166 are urged apart by the wedge device 171 and the brake shoes 125 and 126 are applied to the drum. The performance of the internal shoe drum brake when applied to retard reverse movement of the caravan will be apparent from the foregoing description and will not be described in any more detail. If the brake shoes 125 and 126 are applied to the drum when the drum is rotating with forwards movement of the caravan, the brake shoe 126 is dragged by the drum towards the end plate 169 which is fixed to the backplate 100 and which affords a fixed abutment for the brake shoe 126.

As an alternative to the provision of the coil spring 106 in the abutment assembly 101 of the internal shoe drum brake described above with reference to FIGS. 6, 7 and 8 in order to avoid the application of an excessive braking force by the brake shoe 126 which might lead to wheel locking, the abutment assembly 101 may be replaced by a rigid abutment and a resilient link may be included between the lever 22 and the yoke 35. FIG. 10 shows a suitable resilient link for use in place of the link 25 of the arrangement shown in FIG. 1. The resilient link comprises one link 117 for connection to the end 24 of the lever 22 and another link 178 for connection to the centre of the yoke 35. The end of the link 177 remote from the lever 22 carries a hollow housing 179. The link 178 projects through an aperture 180 in an end wall 181 of the housing 179 and carries a flange 182 within the interior of the housing 179 at its end remote from the yoke 35. A coil spring 183 takes its abutment from the inner surface of the end wall 181 and urges the flange 182 way from the yoke 35.

A heavy close-coiled tension spring may be used in place of the resilient link described above with reference to FIG. 10.

We claim:

1. An internal shoe drum brake comprising a pair of arcuate brake shoes, a shoe expanding device adjacent one end of the shoes to urge the brakes into contact with a brake drum, a carrier member for one brake shoe comprising substantially parallel spaced arcuate plates, rivet means holding said one brake plate in said spaced relationship, said one brake shoe having its web projecting radially into the space between said plates and being circumferentially movable between said spaced plates, a fixed abutment member disposed adjacent the opposite end of said brake shoes, pin means extending through openings in said spaced plates and an enlarged opening in said one brake plate with said enlarged opening extending in a direction permitting movement of said one plate when it is desired to brake in one direction, and abutment means adjacent the opposite end of said one brake shoe to contact it when said shoe expanding device is operated for parking and the brake drums tends to rotate in the opposite direction.

2. An internal shoe drum brake according to claim 1, wherein the shoe expanding device comprises a housing mounted between said adjacent ends of the brake shoes for sliding movement, the respective end of each brake shoe being urged into contact with a respective end of the housing by brake pull-off spring means, and operating means operable to separate the housing and the carrier member, so movement of said one brake shoe in said one direction when said one brake shoe is held in contact therewith, is transmitted to the other brake shoe through the housing.

3. An internal shoe drum brake according to claim 2 wherein the operating means comprises an operating rod for connection to a brake operating mechanism, the operating rod being hinged to one end of a bell crank lever, the bell crank lever being mounted pivotally within the housing by its elbow and having its other end hinged to one end a strut member which has its other end in abutment with the carrier member.

4. An internal shoe drum brake according to claim 1, wherein the abutment means includes resilient means.

* * * * *